(12) United States Patent  
Ferguson

(10) Patent No.: US 6,918,544 B2  
(45) Date of Patent: Jul. 19, 2005

(54) AUTOMOBILE TRACTION DEVICES

(76) Inventor: Clay Ferguson, 34105 El Roble Ave., Eugene, OR (US) 97405

( * ) Notice: Subject to any disclaimer, the term of this patent is extended or adjusted under 35 U.S.C. 154(b) by 3 days.

(21) Appl. No.: 10/429,215

(22) Filed: May 1, 2003

(65) Prior Publication Data

US 2004/0206436 A1 Oct. 21, 2004

Related U.S. Application Data

(60) Provisional application No. 60/448,341, filed on Feb. 18, 2003.

(51) Int. Cl.$^7$ .............................................. E01C 9/00
(52) U.S. Cl. ........................................ 238/10; 152/208
(58) Field of Search ............................ 152/208, 209 R, 152/210, 211, 213 R, 214; 238/10, 14; 36/59 R, 15

(56) References Cited

U.S. PATENT DOCUMENTS

| | | | |
|---|---|---|---|
| 1,747,603 A | 2/1930 | Ruth | |
| 2,408,152 A | 9/1946 | Porcelli | |
| 2,732,065 A | 1/1956 | Marchese | |
| 3,323,572 A | 6/1967 | Farah | |
| 3,335,776 A | * 8/1967 | Peterson | 152/222 |
| 3,561,140 A | 2/1971 | Ludwig | |
| 3,749,309 A | * 7/1973 | Becker | 238/14 |
| 3,797,549 A | * 3/1974 | Lieberum | 152/175 |
| 3,937,262 A | * 2/1976 | Lee | 152/179 |
| 4,795,093 A | * 1/1989 | Kozelnicky | 238/14 |
| 5,044,411 A | 9/1991 | Doll | |
| 5,533,575 A | 7/1996 | Brown | |
| 5,624,509 A | * 4/1997 | Stanley | 152/213 R |
| 5,634,648 A | 6/1997 | Tonel et al. | |
| 5,810,451 A | * 9/1998 | O'Brien | 301/45 |
| 5,836,091 A | * 11/1998 | Cook | 36/59 R |
| 5,921,005 A | * 7/1999 | Bell et al. | 36/59 R |
| 6,016,856 A | * 1/2000 | Hynes | 152/190 |
| 6,022,082 A | * 2/2000 | O'Brien | 301/45 |
| 6,055,748 A | 5/2000 | Harrison | |

\* cited by examiner

*Primary Examiner*—Frantz F. Jules
(74) *Attorney, Agent, or Firm*—Kolisch Hartwell, P.C.

(57) ABSTRACT

Traction devices for an automobile tire include an adherent elongate expanse and a studded layer sandwiched between the adherent layer and the surface of a tire.

14 Claims, 1 Drawing Sheet

AUTOMOBILE TRACTION DEVICES

CROSS-REFERENCE TO RELATED APPLICATION

This application claims priority under 35 U.S.C. § 119 and applicable foreign and international law of U.S. provisional patent application Ser. No. 60/448,341 filed Feb. 18, 2003 which is hereby incorporated by reference in its entirety for all purposes.

FIELD OF THE INVENTION

The invention relates to traction devices, particularly for vehicles that use wheels to travel on roads that may have snow or icy conditions.

BACKGROUND OF THE INVENTION

For many years people have used traction devices such as chains, cables, and studs to improve traction on slippery roads that are covered with snow or ice. However, there are problems with tire traction devices. For example, chains and cables can be quite difficult to put on properly without expertise, especially in adverse weather conditions. Some traction devices are complicated and time consuming to put on.

Another problem with chains and cables is that they require wrapping around the side walls of the tire. This is a problem for some cars that have minimal clearance between the tire and the fender. Chains or cables can be noisy, and may damage the body of the car if there is inadequate clearance around the tire.

Another problem with chains and cables is that they tend to become loose or fall off if not installed properly, or after extended use.

Due to the significant problems with chains and cables, many people prefer to use studded snow tires. Typically, studded tires are placed on the car for the winter and then removed for the summer. Studs may work well as a traction device, but can be damaging to the road. For this reason, some states prohibit the use of metal studs.

Accordingly, there is a need for improved traction devices that solve some or all of the numerous problems with prior traction devices.

SUMMARY OF THE INVENTION

The invention provides improved traction devices, and related methods, involving adhesively-bound patches or expanses around at least a portion of the circumference of a tire.

DESCRIPTION OF THE PREFERRED EMBODIMENTS

Figure 1:
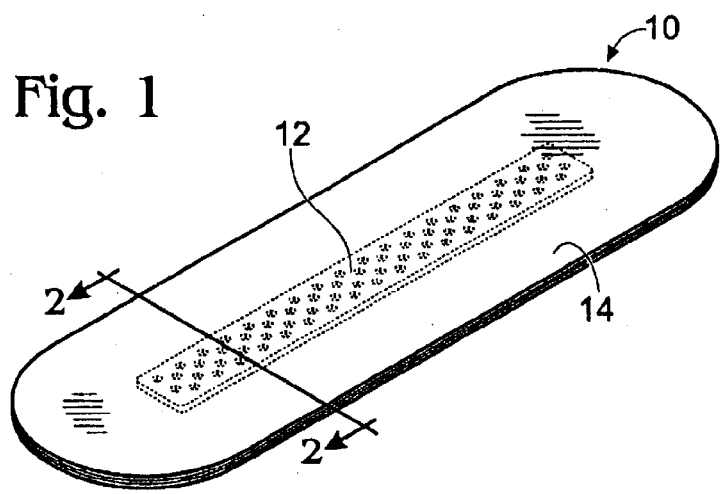
FIG. 1 is an isometric view of a traction device.
Figure 2:
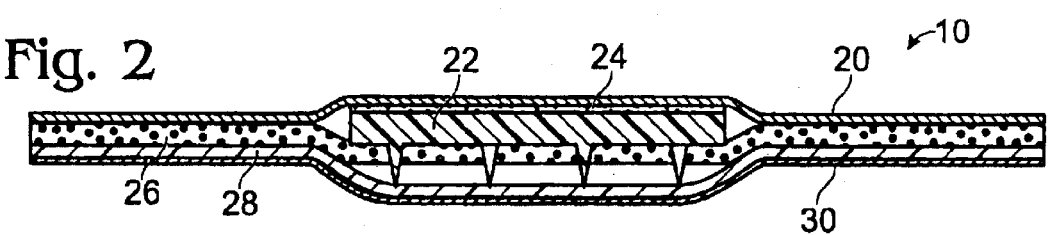
FIG. 2 is a cross-sectional view of the traction device shown in FIG. 1.

FIG. 1 shows traction device 10 including traction strip 12 (in dashed lines) sandwiched between various flexible layers 14. FIG. 2 shows a cross section through traction device 10. Top clear plastic sheet 20 is part of the product packaging. It protects adhesive on the subsequent layer which is used to bond the traction device to the outer surface of a tire. Protective sheet 20 may be transparent and treated with silicone so it is easy to remove before installing traction device 10.

Stud strip 22 is made of extruded, hard plastic. For example, appropriate stud strip material can be procured in rolls three-feet wide from Superior American Plastics in Buffalo Grove, Ill., as Product No. MG-1 Clear, Heavy Duty Vinyl. Double-stick adhesive layer 24 is applied on the side of the stud strip 22 opposite from studs 25 for adhering stud strip 22 to a tire. Double-stick adhesive layer 24 may be 1-inch wide Venture Tape from Rockland, Mass. For example, studs 25 may have a length of $3/16$ths-inch. The sheet portion of stud strip 22 may be 40-thousandths-of-an-inch.

Studs 25 of stud strip 22 impinge on a bi-layer flexible material procured from Hardcast and Carlisle in Tyler, Tex. The Product No. is 6325. The material may be provided in rolls, 50-feet in length and 6-inches wide. The bi-layer includes an adherent butyl layer 26 with adhesive that sticks very well on rubber. The thickness of butyl sheet 26 is 25-thousandths-of-an-inch. Layer 28 is selected to contact and interact favorably with the surface of a road. Layer 28 is a shape-adapting rubber membrane bound to grey adhesive sealant layer 26. Rubber membrane 28 may be approximately 30-thousandths-of-an-inch. Rubber membrane 28 positively enhances traction in addition to functioning to hold and secure stud strip 22 to tire 40. Rubber membrane 28 adapts to grip and maintain rocks, sand and hard debris from the road which then enhances the stud affect of the device. Finally, protective sheet 30 is applied to rubber membrane 28, and then removed shortly before use.

Figure 3:
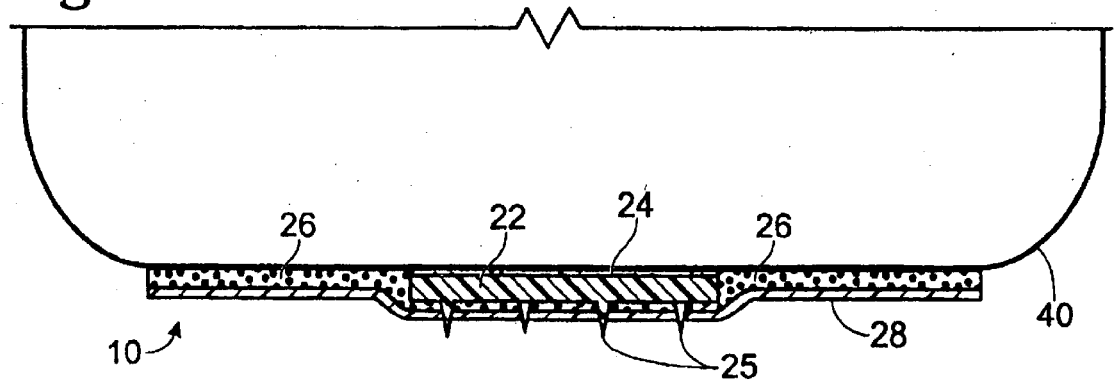
FIG. 3 is a partial sectional view of the traction device shown in FIGS. 1 and 2, applied to a tire.

FIG. 3 shows traction device 10 applied to tire 40. Protective layers 20 and 30 have been removed. The weight of the automobile causes studs or spikes 25 to puncture and extend beyond adhesive layer 26 and rubber membrane 28.

Figure 4:
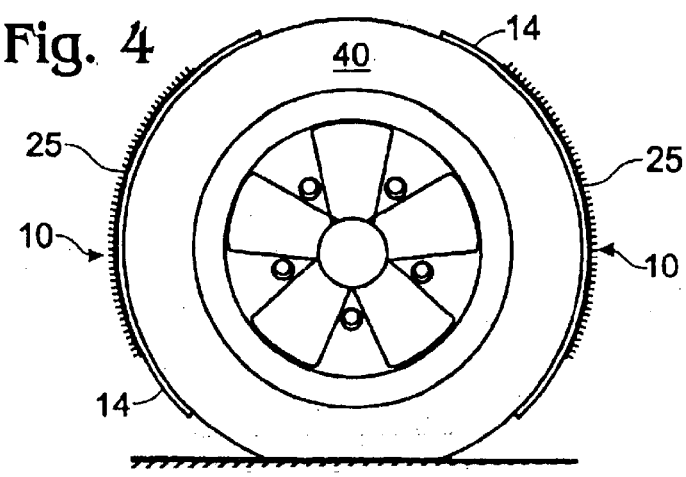
FIG. 4 is a side view of a vehicle tire with a traction device mounted around its circumference.

FIG. 4 shows traction device 10, for example, an adhesive patch, applied to tire 40. In a preferred mode of practicing the invention, two traction devices such as 10 in FIG. 1 are applied to each tire. The size of the traction devices may depend on the size of the tire. For example, for most standard size automobiles, two patches are applied to each tire. Each patch is 16-inches long, 6-inches wide, and cut in an oval shape without any corners. The oval shape, i.e., absence of corners, of traction device 10 and/or traction strip 12, makes it less likely to detach from the tire. The sandwiched traction strip, as illustrated, is 12-inches long, 1-inch wide and cut without any corners. Alternatively, the traction strip may be substantially rectangular, as in the example depicted in FIG. 1. The traction strip has approximately 80 studs per strip, i.e., per patch. Therefore, each tire has approximately 160 studs concentrated towards the center of the tire. For a smaller car, such as a car that uses a 13-inch tire height, the adhesive patch may be 4-inches wide, again using a 1-inch wide stud strip. An 8-inch wide patch may be used on larger truck tires.

One advantage with the device design shown in FIGS. 1–4 is that it sticks to the tire without any extension to the side wall of the tire. Thus, it is less likely to interfere with the body of the car.

In use, it is sometimes helpful to warm up the traction devices before applying them to a tire. For example, traction devices may be placed on the dashboard of the car with the heater running for a few minutes, thus softening the adherent sheet and adhesive before application.

When applying the traction devices to front tires, it may be helpful to turn the tires in one direction while applying the first patch to each front tire; and then turning the tires in the opposite direction to apply a second patch to each front tire.

In some situations, better results are achieved by pretreating the outer surface of the tire. For example, removing debris from the outer surface of the tire, and drying the tire before applying the patch may improve the bond between the patch and the tire. A drying cloth may be provided with the traction devices for removing moisture from the surface of the tire prior to applying the traction devices. Once the tire is clean and dry, a clear protective sheet is removed from the adherent side of the pliable adhesive layer. The traction device is then applied to the outer surface of the tire, making sure that all edges of the traction device are touching the tire. At least two traction devices should be applied on each of the drive wheels of the car. Additional traction enhancement may be gained by applying traction devices to the non-drive wheels of the car.

The studs are made of a hard material, for example, hard plastic or metal. Some states may not permit metal studs. In a preferred embodiment, the plastic studs are molded on one side of a plastic sheet. The geometrical configuration of the studs are generally tapered to a point, however, other shapes may be used provided the studs are capable of piercing through the primary pliable adherent layer.

While the present invention has been particularly shown and described with reference to the foregoing preferred embodiments, those skilled in the art will understand that many variations may be made therein without departing from the spirit and scope of the invention. The description of the invention should be understood to include all novel and non-obvious combinations of elements described herein, and claims may be presented in this or a later application to any novel and non-obvious combination of these elements. Where the following paragraphs recite "a" or "a first" element or the equivalent thereof, such paragraphs should be understood to include incorporation of one or more such elements, neither requiring nor excluding two or more such elements.

I claim:

1. A traction device for mounting on a vehicular tire comprising
    a flexible sheet-like expanse having first and second sides, studs protruding from the first side, and adhesive on the second side for adhering the expanse to the tire with a long-axis of the expanse alligned with the circumference of the tire,
    wherein the expanse is comprised of at least two layers, a first elongate flexible layer and a second layer having studs formed thereon, the two layers being bound together, and wherein the studs on the second layer impinge on the first layer.

2. A traction device for mounting on a vehicular tire comprising
    a flexible sheet-like expanse having first and second sides, studs protruding from the first side, and adhesive on the second side for adhering the expanse to the tire with a long-axis of the expanse aligned with the circumference of the tire,
    wherein the expanse is comprised of at least two layers, a first elongate flexible layer and a second layer having studs formed thereon, the two layers being bound together, and wherein the studs pierce the first layer.

3. A traction device for mounting on a vehicular tire comprising
    a flexible sheet-like expanse having first and second sides, studs protruding from the first side, and adhesive on the second side for adhering the expanse to the tire with a long-axis of the expanse aligned with the circumference of the tire,
    wherein the expanse is comprised of at least two layers, a first elongate flexible layer and a second layer having studs formed thereon, the two layers being bound together, and wherein each of the layers has rounded ends.

4. A traction device for mounting on a vehicular tire comprising
    a flexible sheet-like expanse having first and second sides, studs protruding from the first side, and adhesive on the second side for adhering the expanse to the tire with a long-axis of the expanse aligned with the circumference of the tire,
    wherein the expanse is comprised of at least two layers, a first elongate flexible layer and a second layer having studs formed thereon, the two layers being bound together, and wherein the area of the first layer is substantially greater than the area of the second layer.

5. A traction device for mounting on a vehicular tire comprising
    a flexible sheet-like expanse having first and second sides, studs protruding from the first side, and adhesive on the second side for adhering the expanse to the tire with a long-axis of the expanse aligned with the circumference of the tire, and
    removable protective sheets on the first and second sides of the expanse.

6. A traction device for mounting on a vehicular tire comprising
    a first sheet having adhesive on at least a first side, a second sheet bound to the first side of the first sheet, wherein the second sheet has a plurality of stud structures with tips contacting the first side of the first sheet, the first and second sheets being configured so that the stud structures remain substantially covered by the first sheet until the weight of an automobile causes the stud structures to puncture through the first sheet.

7. The traction device of claim 6, wherein the first sheet has a central region aligned with a long-axis, the stud structures being concentrated in the central region of the expanse.

8. The traction device of claim 6, wherein the first sheet has a corner-less shape.

9. The traction device of claim 6, wherein the second sheet has a continuous edge that is completely covered by the first sheet when the traction device is mounted on the tire.

10. The traction device of claim 6, wherein each of the first and second sheets has a width, the width of the first sheet being substantially greater than the width of the second sheet.

11. A traction tire assembly comprising a vehicular tire, an elongate patch adhesively bound to the tire, the patch including a first sheet having adhesive on a first side adhering the first sheet to the tire, and a second sheet sandwiched between the tire and the first side of the first sheet, wherein the second sheet has a plurality of stud structures protruding through the first sheet.

12. The traction device of claim 11, wherein the first sheet has a central region aligned with a long-axis, the stud structures being concentrated in the central region of the expanse.

13. The traction device of claim 11, further comprising a second elongate patch, the patches being bound in series around the circumference of the tire.

14. The traction device of claim 11, wherein the patch does not extend on to the sidewalls of the tire.

* * * * *